United States Patent [19]
Leon

[11] Patent Number: 5,495,088
[45] Date of Patent: Feb. 27, 1996

[54] PROCEDURE FOR MEASURING THE TEMPERATURE OF THE AREA SUBJECTED TO A RISE IN TEMPERATURE AT THE TIME OF AN OPERATION OF WELDING OR OF CRIMPING, AND PROCEDURES OF APPLICATION TO THESE OPERATIONS

[76] Inventor: Paul Leon, 2, Impasse des Sablons, 27630 Berthenonville, France

[21] Appl. No.: 190,547

[22] Filed: Jan. 31, 1994

[30] Foreign Application Priority Data

Feb. 1, 1993 [FR] France .................................... 93 01371

[51] Int. Cl.⁶ ........................................... B23K 11/25
[52] U.S. Cl. ................................. 219/110; 219/109
[58] Field of Search ............................. 219/109, 110

[56] References Cited

U.S. PATENT DOCUMENTS 3,309,494  3/1967  Herbert et al. .

FOREIGN PATENT DOCUMENTS 42-16547  9/1967  Japan ............................................. 219/109
1558609  4/1990  U.S.S.R. ........................................ 219/110

*Primary Examiner*—Clifford C. Shaw
*Attorney, Agent, or Firm*—Laff, Whitesel, Conte & Saret, Ltd.

[57] ABSTRACT

A process measures the temperature of the space between one or more pieces that are subject to a rising temperature during a welding or a setting operation. Thermoelectric sources are used to form at least one of the interfaces placed between at least one electrode (5; 10,11) and the pieces (1; 13, 14) and between the pieces, to supply thermoelectricity by an electric resistance (16), to measure the current that flows through resistance (16).

8 Claims, 3 Drawing Sheets

"PROCEDURE FOR MEASURING THE TEMPERATURE OF THE AREA SUBJECTED TO A RISE IN TEMPERATURE AT THE TIME OF AN OPERATION OF WELDING OR OF CRIMPING, AND PROCEDURES OF APPLICATION TO THESE OPERATIONS"

The present invention relates to a process of measuring of the temperature of space at one or more pieces that are subject to an elevated temperature during the operations of welding and setting. In a welding operation, a temperature is used in a relationship with the temperature of the welding core between the welded pieces of metal which fuse. In a setting operation, the temperature increases at the interface between the pieces of welding electrodes and the metal piece to be welded.

The invention relates also to the process of verification of one parameter of the welding, respectively, one welding operation and one setting operation that uses the process of measuring of temperature during the welding.

We already know that such a process can be carried back usefully as set froth in a patent application WO-92 00818, filed by the present applicant on Aug. 25, 1992.

The process of measuring the temperature described in this patent application uses a measurement signal of a temperature which is the thermoelectric signal taken from at least one interface lying between the pieces or lying between one electrode and the piece with which this electrode is in contact.

In a setting operation, the temperature measurement signal is taken directly at the interface where the weld is setting. In a welding operation a report which is kept of the proximity of the interfaces is able to give the thermoelectric signals at the welding core where the metals fuse. The measure signal kept in that manner is representative of the temperature of the welding core. This temperature is found with a high precision and without delay.

As a consequence, in both the welding operations and the setting operations, we used a measurement of current as a signal of temperature, given by the thermoelectric power at the interfaces for the verification of at least one the parameters of a welding or a setting operation. More particularly, the parameter may be either welding or setting current. For doing so and according to the known process, we compare, at first, the value of a measurement temperature signal with a predetermined value. We then operate responsive to the value of the temperature signal in terms of the comparison of that manner of execution. The predetermined value corresponds to the value of one measurement signal obtained at the same moment t and in the same conditions. More particularly, the nature of the dimension of the pieces, for a previous welding or setting operation, has appeared favorable from a point of view of both a mechanical and a metallurgic sense.

More particularly, at least one interface between one electrode and one of the pieces to be welded may be relatively small in comparison with the dimension of the base of the electrodes that we defined by the terms "punctual interface." But also, when we have the pieces to be welded that are a sum of "punctual interface." Indeed, the limiting factors resulting from the small volumes delimiting for these interfaces and the crossing of the welding or setting current show how rapidly the temperature can grow and the level it can reach in the welding or setting operation. The abnormally raising value is compared at the temperature of the welding core where the metal fuses or of the hot part of the setting piece. As a result, the voltage becomes a thermoelectric signal which raises much more than the voltage of the signal that must be produced. The report is kept of the real temperature of the welding core or of the temperature of the piece to be set.

To explain this general problem, we make explicit, the case of a hot setting of one collector segment of an electric motor. We will refer to FIG. 1 in which we see a collector segment 1 having an end 2 which is bent back to enclose an electric wire 3. This bend establishes the connection of one coil of one a rotor of the motor as one collector of the rotor.

The segment 1 is mounted on a cylinder 4 in an electrically insulating material.

One electrode 5 is arranged for exert, a force on the end 2 of the segment 1, the force acting in the direction (arrow A). The part 6 holds the segment 1 that is secured on an insulating cylinder 4 in order to bend back part 2 against part 1. A source of current 7 is connected to the electrode 5 in the same way that second electrode 8 is in electric contact with the part 6 of the segment 1. A current setting is delivered between the end 2 and the part 6. A central unit 9 comprises an internal voltameter (not shown) to measure the thermoelectric voltage expanded at the interface between the electrode 5 and the end 2. At each moment t, the unit 9 compares the value of the predetermined voltage value, for example, stored in a memory which is internal in the unit 9. Unit 9 comprises one output connected to one control input of the current source 7 to control the current intensity delivered responsive to the comparison which is executed at the moment t:

The temperature at end 2 of segment 1 determines the particular termination of the setting current released by the source.

Instead of a setting operation, the area of the interface between the end 2 of the segment 1 and the electrode 5 is relatively small as compared to the area of the base to the electrode 5. The end 2 of the segment 1 forms the seam that, impairs the condition of the surface of the end interface 2 at electrode 5, reducing an area of contact. The setting current travels through the small volume at the end 2 by the segment 1 that finds itself in contact with the electrode 5. As a result, a rapid over shooting of the temperature in this small volume, is much quicker at the end 2. The thermoelectric voltage measured between the electrode 5 and the end 2 is not then representative of the temperature of the end 2. This is particularly true at the beginning of the setting operation.

The regulation of the current from the source 7 is hence disturbed by a process of the measurement t.

We have exhibit, at the FIG. 2, a graph showing the change of voltage as a function of time, starting at time t and leading to one setting process. The thermoelectric voltage U is measured at the terminal of the electrodes 5 and 8. We can also verify the raised voltage which starts at the time t, the raise being extremely quick and not corresponding to a normal raising of the temperature in the end 2 of the segment 1.

The same phenomenon can take place at the time of a particular point in the welding operation when the interfaces between electrodes and the piece of welding material are in a condition such that it can be considered as the sum of the punctual interfaces, in the sense given above. The small and limited volume at each interface, through which the welding current flows is the seat of abnormally raising temperature. As a result, as before, a signal of the measurement of temperature is erroneous mistaken and can not be put in a proper relation with the temperature by the welding core where the metal fuses. It follows that there is an incorrect regulation of the welding current caused by this measure of the temperature.

In a manner all to general, we have to understand that the problem is that the thermoelectric signals engendered at the interfaces between the pieces to be welded or set and the electrodes are representative of the temperature of low volumes of pieces that are limited by this punctual interfaces through which the welding or setting current travels. Their temperatures have raised much too fast and much too uncertainly the temperature of welding or setting space. As a result, the measurement of temperature is mistaken and consequently, is the wrong regulations of welding or setting current.

Therefore, the purpose of the invention is to process the measurement of the temperature in a manner described above so that we do not measure the temperature of the small volumes which become very hot at the interfaces between electrodes and pieces to be welded, and between the same pieces.

The invention uses the thermoelectric source at a minimum of at least one of the interfaces situated between an electrode and one of the pieces and between the pieces, in order to supply the thermoelectric sources in one electric resistance and to measure the current that travels through the resistance as a result of a temperature signal.

According to another characteristic of the invention, the electric resistance at these terminals are respectively connected, on one part at one electrode or a one the pieces and, the other part, at the other electrode or other piece.

A means must be provided for consuming the source to respond to a thermoelectric signal. This means presents a measure of a thermoelectric effect to at least one of the electrodes in an alloy metal of the piece with which it is in contact or to the alloy of the other electrode.

According to the process of the invention, the source or sources of thermoelectric energy supply the resistance. Or, the measured current travels through the resistance depending on the volume of this source, if although the influence of all exact source is small if it is not negligible. As a result, the process of the invention can give one value which is representative of the temperature in the entire space that has been submitted to the raising temperature caused by flow of the welding or setting current.

The measurement of the temperature, according the process of the invention, can be accomplished in a continuous stream welding or setting operation. And can be accomplished equally, after one welding or setting operation.

The process of the invention can work equally well in the case of welding or setting operations in which the raising of the temperature is not secured by current flow, but for given deposits of thermic energy.

The invention relates equally a process of verification of parameters of welding operations and a process of verification of parameters of setting operations that are respectively the applications of the process of measure for such operations.

These applications, in the same way as the measurement process as described above, are described hereafter with respect to the attached drawing in which.

Figure 3:
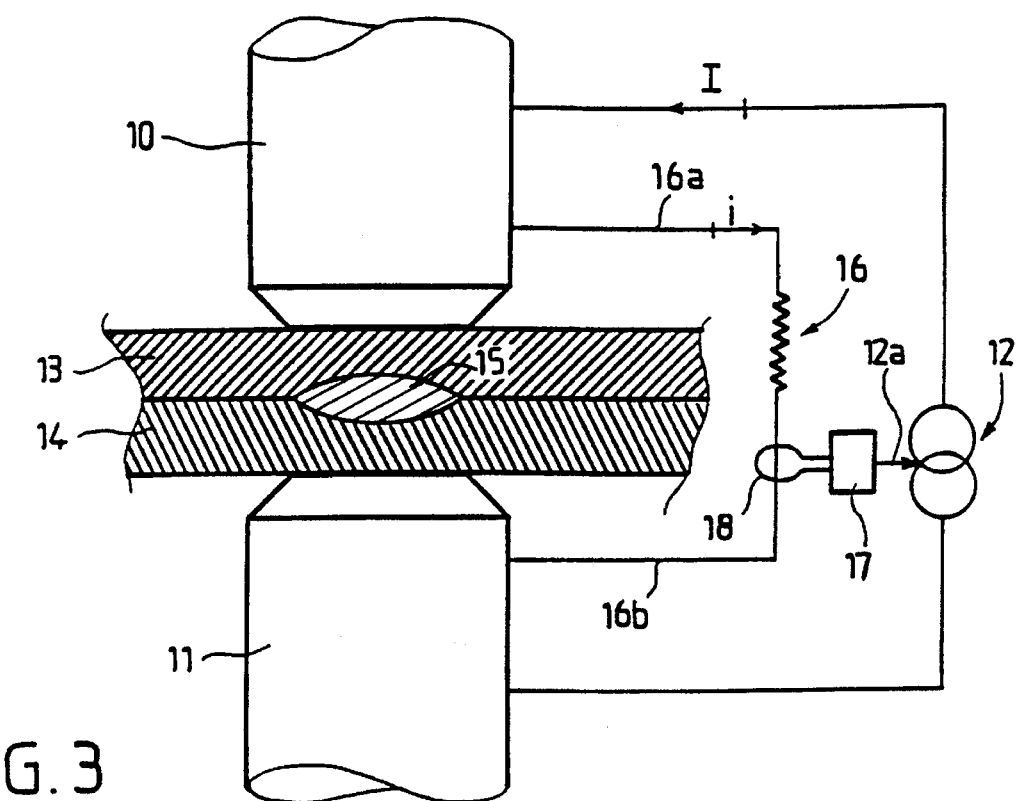
FIG. 3 is a schematic diagram of one welding machine that works according to a process of verification according to the invention.

The welding machine shown in FIG. 3 comprises essentially two electrodes 10 and 11 respectively connected to one source of current 12. The two electrodes 10 and 11 are in contact with two pieces 13 and 14 and permit the flowing of the current I deliver by the source 12 in the space of the thickness the two pieces 13 and 14 between the electrodes 10 and 11. As a result by the flowing of this current I in the pieces to weld 13 and 14, a raising temperature in the space between pieces 13 and 14, fills the fusion of core 15 that, once cooled, will constitute one point of the welding between the two pieces 13 and 14.

One resistance 16 has terminals 16a and 16b that are respectively connected to the electrodes 10 and 11. A central unit 17 comprises, one input which is connected to apparatus for measuring current 18 for the measurement of the current which flows in the resistance 16. Central unit 17 has an outlet which is connected to one input 12a of the current source 12.

The resistance 16 has a value in the region of a few milliohms. We have to measure, then of welding operations and the current of measurement i in the region of a few amperes, typically 3 amperes.

The measuring apparatus 18 has been shown as a loop for picking up current. We understood that it can also be any other apparatus for measuring current, such as an apparatus depending on a Hall effect.

The measurement of current i in the resistance 16 can equally constitute a measurement of the voltage between these terminals 16a and 16b and to calculate the current by application of the Ohm's law. This measurement of voltage does not compare to those that are executed according to the prior art. Indeed, the measurement according to the invention is executed at the terminals of the resistance 16 that makes a shunt of the source of thermoelectric current. By contrast, according to prior art, it does not use the resistance of the shunt.

We will remark that the resistance 16 can have one of its terminals 16a and 16b connected to one electrode 10 or to one of the pieces 13 or 14 and, the other of its terminals through another electrode 11 or to one other piece, either 13 or 14, without exiting purpose of the invention.

The operation of the central unit 17 is according a succession of cycles having two phases.

In the first phase, the unit 17 operate on the source of current 12 so as to deliver the welding current I to the pieces to weld 13 and 14. In the first cycle, the welding current intensity is predetermined. In the next cycles, the welding current corresponds that which has been determined in the second phase of preceding cycle.

In the second phase, the unit 17 measures the intensity of the current i that travels through the resistance 16 and that compares to a predetermined value that is, for example, stored in the internal memory of the unit 17 for the moment in the welding process. The entire values that are stored in this memory for each of the moments t of one welding process is that which has, for example, been previously obtained, in the same condition for, more particularly, the thickness and the constitution of the pieces 13 and 14, in welding two pieces 13 and 14 that appeared to have been welded with a good mechanical and metallurgical effect. During this second phase of each cycle, the source of current 12 is inactive.

The unit 17, in function by the result of this comparison, determines the one value for the current intensity of welding I which will apply to the first phase by the next cycle.

Figure 4:
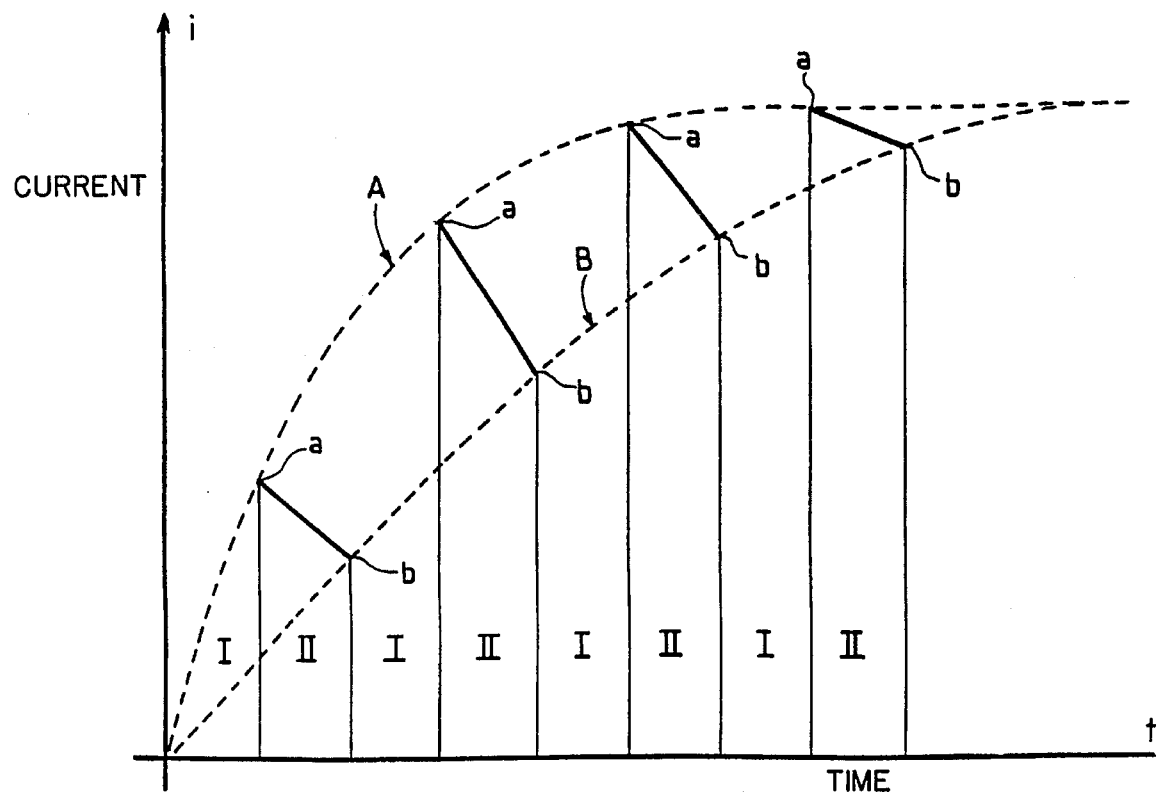
FIG. 4 is a graph showing the measuring current in the resistance as a function of time.

In FIG. 4, we have shown a graph that shows the current intensity i as a function of time. The upper curve shows the application phase 1 of the welding current i and the lower curve shows the measurement phases phase II of current i. We prove that pending the phases II (the measurement), the intensity current of measure i decreases. This decrease corresponds to the cooling pending the welding, in phases II, of the space pieces 13 and 14, included between the two electrodes 10 and 11.

According to a measurement of the current intensity i to the beginning (points a) or to the ending of the phases II (points b), we obtain a graphic curve i(t), as that which is referenced A or as that which is referenced B in FIG. 4.

Advantageously, to determine the welding current i during one phase I that follows one phase II, we use the measurement of the current intensity i to the end of this phase II (points b).

From the determination of the inclinations, to the straight lines that join the points a to the point b, it is possible to have an estimation of the size by the volume that sustains a raising of temperature during the phase I of the application by welding current.

We will mark the moment in first phase of each cycle, when the source of current 12 supplies the pieces 13 and 14, but equally in the resistance 16, indeed that this is electrically in parallel with the two pieces 13 and 14. We have thus measured, during this phase, the current of a few hundred of amperes in the resistance 16. Also, the means permitting a dissipation of the thermic energy delivered then by the resistance 16 must be provided.

The materials that compose electrodes 10 and 11 are provided for at least one interface between the electrodes 10 and 11 and the pieces to be welded 13 and 14 as the source of a significant thermoelectric current, that is to say a current where the intensity is obviously proportional at the temperature reached by this interface and the amplitude is measurable.

Figure 1:
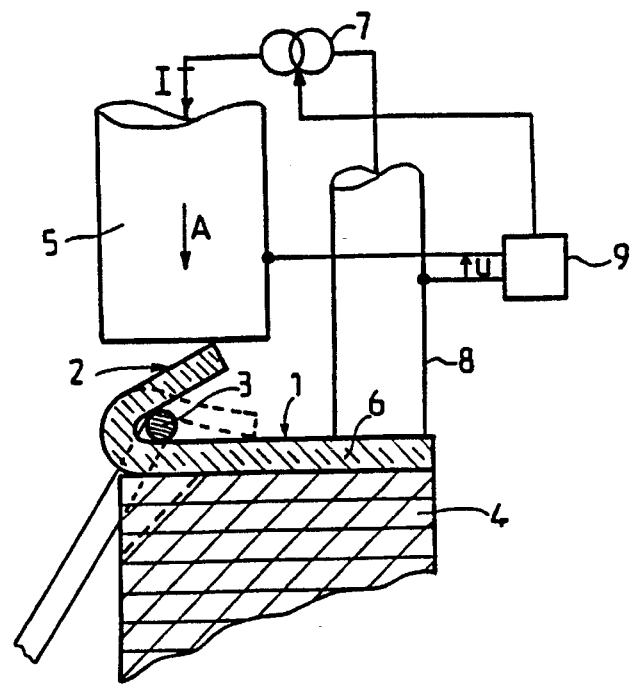
FIG. 1 is a schematic diagram of one installation for setting a collector segment of electric motor according to the prior art.
Figure 5:
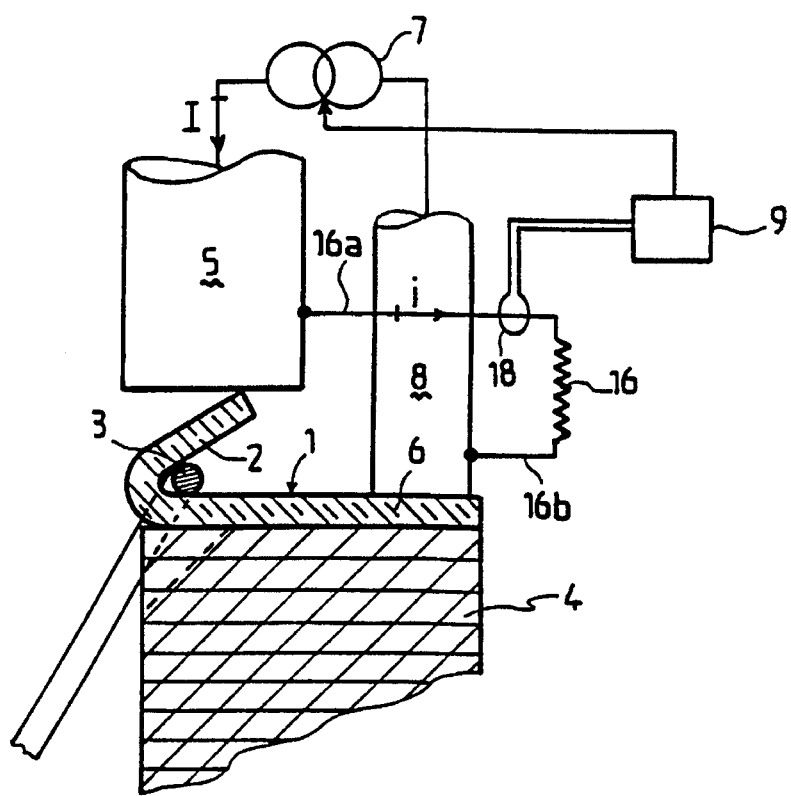
FIG. 5 is a schematic diagram one installation for setting a collector segment of electric motor that works according to a process of verification according to the invention.

The installation of the machine shown in FIG. 5 shows the same elements that are shown at the FIG. 1. Consequently, these same elements carry the same reference numerals.

A resistance 16 has terminals 16a and 16b that are respectively connected to the two electrodes 5 and 8.

As in the machine shown at the FIG. 3, the machine of FIG. 5 comprises a central unit 9 having an input connected to the apparatus for 18 measuring current intensity i that flows in the resistance 16. An output of unit 9 is connected at one input to the current source 7.

Similar to unit 17 of the machine according the FIG. 3, the operation of central unit 9 has cycles of two phases, in one phase there is a measurement of temperature and in one phase there is an application of the setting current.

We remark that, as well as in the machine according to FIG. 3, in the machine according the FIG. 5, the thermoelectrics source or sources present in at least one of the interfaces between the electrodes 5 and 8 or 10 and 11 and the pieces to weld 13 and 14 or the piece to supply the resistance 16, which is of a small value. As a result of the measurement of current, a record is kept of the internal resistance of this or these thermoelectrics sources, internal resistance that is apparent and has a direct function by the volume that is the source by the current of measure.

Figure 2:
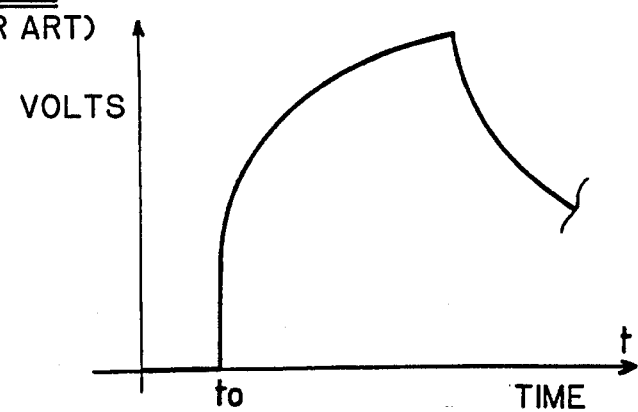
FIG. 2 is a graph showing the raising of the thermoelectric voltage taken with respect to time, in the case of one setting of one segment of electric motor made by the installation according to the FIG. 1.
Figure 6:
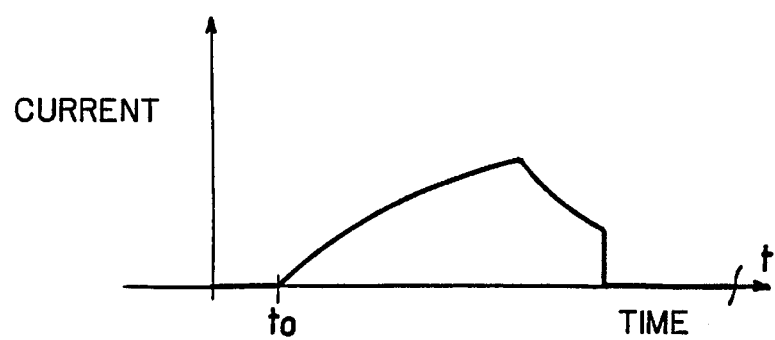
FIG. 6 is a graph showing the raising in current as a function of time, the current traveling through one resistance according to the invention in the case of one setting made by an installation according to the FIG. 4.

The graph of the FIG. 6 has shown the raising in the time of the measured current intensity i that flows through the resistance 16 of a machine according the FIG. 5. Contrarily to this, as shown in the FIG. 2, the raising current is progressive. The measured current, therefore, is in relation with the raising of temperature in the piece to set.

I claim:

1. A process of verification of the size of at least a particular interface in a welding operation, said process comprising subjecting a plurality of pieces to a welding current flowing between two welding electrodes in order to raise the temperature of a space between said two welding electrodes, and placing said plurality of pieces to carry said flowing welding current to cause the welding of said pieces, said process comprising the steps of:

a. measuring the intensity of the current that flows through a resistance having one terminal connected to one of said welding electrodes and another terminal connected to another of said welding electrodes, said current being produced by a thermoelectrical effect in at least one interface between at least one of the two welding electrodes and at least one of said plurality of pieces, and between the plurality of pieces;

b. comparing the value of the measured current intensity to a predetermined value; and c. operating said welding on a basis of the measured size of said interfaces in response to said comparison.

2. A process of verification of the size of at least a particular interface in a welding operation, said process comprising subjecting a plurality of pieces to a welding current flowing between two welding electrodes in order to raise the temperature of a space between said two welding electrodes and to cause the welding of said plurality of pieces in response to a flow of said welding current, said process comprising the steps of:

a. measuring the intensity of current that flows through a resistance having one terminal connected to one of the said plurality of pieces and another terminal connected to at least one other of said pieces, said current being produced by a thermoelectric effect in at least one interface between the said plurality of pieces;

b. comparing the measured value of the current intensity to a predetermined value; and c. performing a welding operation on a basis of the size of said welding interface in response to said comparison.

3. A process of verification of at least a welding parameter during one hot setting operation, said process comprising the steps of sending a welding current through one welding electrode, a first piece to be welded resting against another piece to be welded, raising the temperature and causing the welding of said pieces in response to said welding current in the space included between said welding electrodes, said process comprising:

a. measuring the intensity of said welding current flowing through a resistance having terminals that are respectively connected to one welding electrode and to one of said pieces, said current being produced by a thermoelectrical welding effect at the interface between the electrode and said piece;

b. comparing the value of the measured current intensity to a predetermined value; and c. performing said welding on the basis of said comparison of step b.

4. A process of measuring the temperature of a space at one piece that is subjected to an elevated temperature during a welding operation or a setting operation, said process comprising the following steps:

supplying a thermoelectrical signal through an electric resistance from an interface between one welding electrode and said piece, measuring a current flowing through said resistance, and forming a temperature signal responsive to said measured current, said temperature signal being representative of said space temperature.

5. A process of measuring as set forth in claim 4, wherein there are two of said pieces, and said resistance has one terminal connected at one of said pieces and another terminal connected at one the other piece.

6. A process of measuring as set forth in claim 4, wherein said measuring step includes measuring the temperature of said space at more than one piece that are subjected to an elevated temperature during the welding operation or setting operation, said supplying step comprises equally supplying said resistance with the signal generated at one interface between at least one welding electrode and one piece and the signals generated between said pieces.

7. A process of measuring as set forth in claim 6, wherein said resistance has one terminal connected at one welding electrode and another terminal connected at another welding electrode.

8. A process of measuring the temperature of a space at one or more pieces that are subjected to an elevated temperature during a welding operation or a setting operation, said process comprising the following steps:

supplying a thermoelectric signal generated between one welding electrode and a piece or another welding electrode or between one piece and another piece, said thermoelectric signal being supplied through an electrical resistance, measuring a current flowing through said resistance, and forming a temperature signal representative of said space temperature responsive to said measured current.

\* \* \* \* \*

UNITED STATES PATENT AND TRADEMARK OFFICE
CERTIFICATE OF CORRECTION

PATENT NO. : 5,495,088
DATED : February 27, 1996
INVENTOR(S) : Paul Leon

It is certified that error appears in the above-indentified patent and that said Letters Patent is hereby corrected as shown below:

Change the word "setting" to --fusing-- at the following locations:

Col. 1, lines 11, 14, 19, 30, 32, 39, 42, 52, 62, 64, 67;

Col. 2, lines 6, 30, 32, 37, 44, 49;

Col. 3, lines 6, 8, 10, 41, 44, 45, 47, 52;

Col. 5, line 59;

Col. 6, line 52;

Col. 7, line 5 and last line; and

Col. 8, line 11.

Col. 2, line 18, change "current setting" to --fusing current--.

UNITED STATES PATENT AND TRADEMARK OFFICE
CERTIFICATE OF CORRECTION

PATENT NO. : 5,495,088
DATED : February 27, 1996
INVENTOR(S) : Paul Leon

It is certified that error appears in the above-indentified patent and that said Letters Patent is hereby corrected as shown below:

Col. 5, line 10, change "1" to --I--; change "i" to --I--; line 12, change "We prove that pending" to --It can be seen that during--; line 13, before "current" insert --of--; delete "of measure".

Signed and Sealed this

Twenty-first Day of January, 1997

Attest:

BRUCE LEHMAN

*Attesting Officer*  *Commissioner of Patents and Trademarks*